Patented Feb. 4, 1941

2,230,591

UNITED STATES PATENT OFFICE 2,230,591

ALIPHATIC ALDEHYDE CONDENSATION PRODUCTS AND A PROCESS FOR MAKING THEM

Franz Gottwalt Fischer, Wuerzburg, and Alois Waibel and Hermann Zorn, Ludwigshafen-on-the-Rhine, Germany, assignors, by mesne assignments, to General Aniline & Film Corporation, New York, N. Y., a corporation of Delaware No Drawing. Application January 27, 1938, Serial No. 187,172. In Germany February 6, 1937

8 Claims. (Cl. 260—691)

The present invention relates to a process for the production of oxygen containing condensation products from lower molecular carbonyl compounds by means of condensing salts of organic amines in a special manner.

It is already known that aldehydes may be condensed with each other or with ketones to form compounds similar to aldol with the aid of primary and secondary amines or their salts.

We have now found that the condensation can be carried out in a specially advantageous manner industrially and that high molecular weight aldehydes, ketones or alcohols (i. e., aldehydes, etc., which contain at least 8 carbon atoms in the molecule) can be obtained from lower molecular weight saturated or unsaturated carbonyl compounds, i. e. aldehydes or mixtures of such aldehydes and ketones, by condensing the said lower molecular weight compounds by means of salts of organic amines having a condensing action in the presence of an excess of acid and if desired hydrogenating the resulting condensation products.

As initial materials for the said process there may be mentioned for example acetaldehyde, acetaldol or crotonaldehyde. The said aldehydes may also be used in admixture with ketones, such as acetone, methyl ethyl ketone, acetophenone or hexahydroacetophenone. The initial materials are preferably used as free as possible from water but this is not essential.

As amine salts having condensing action there may be mentioned in particular the salts of primary or secondary amines, as for example ethylamine, ethanolamine, dimethylamine, diethylamine, dibutylamine, diamylamine and dicyclohexylamine. Heterocyclic amines, such as piperidine, pyrrole, morpholines, pyrrolidine, decahydroquinoline and hydrogenated naphthoquinolines are also suitable. The salts of substitution products of the said amines, such as di- or triethanolamine, diethylbutanolamine or $\beta,\beta'$-dichlor-diethylamine, may also be used with advantage.

The amine salts or mixtures of the same are caused to act on the lower molecular weight aldehydes or aldehyde-ketone mixtures in the presence of excess of a weak acid. As suitable weak acids there may be mentioned organic and weak inorganic acids. Examples of the organic acids are formic acid, glacial acetic acid, palmitic acid, oxalic acid, malonic acid and succinic acid and also substituted carboxylic acids, as for example monochloracetic acid and lactic acid. Unsaturated and aromatic acids may also be used, as for example fumaric acid or crotonic acid, moreover aromatic acids, such as benzoic acid and hippuric acid. Among inorganic acids there may be mentioned for example phosphoric acid, boric acid or carbonic acid. The acids may also be used in the form of their anhydrides, as for example carbon dioxide, acetic anhydride or the like. Mixtures of acids may also be used. It is not necessary to use the same acid as is already present in combination in the amine salt, for example piperidine acetate may be used in the presence of an excess of carbon dioxide.

The condensation is preferably carried out with the exclusion of oxygen by adding the aldehydes or the like to be condensed to the excess acid and then introducing the amine salt. Instead of the salt, the free amine may be added, in this case the amount of acid must be correspondingly greater. The excess of acid preferably to be used is dependent on the nature of the acid and of the amine salt used and may readily be ascertained by a preliminary experiment. Generally the acid is to be employed in an amount from 6 to 40 molecular proportions to 1 molecular proportion of the amine salt. For example in the condensation of crotonaldehyde it is preferable to use from 10 to 30 molecular proportions of glacial acetic acid to 1 molecular proportion of piperidine acetate. The amine salt may be used in a suspended or dissolved state, in the latter case inert solvents are to be employed. If desired the amine salt may be dissolved or suspended in the acid and the solution or suspension added to the aldehydes or to the mixtures of aldehydes and ketones to be condensed. In many cases it is preferable to add during the condensation further amounts of the condensing salts or the acids and if desired of the initial materials. The aldehydes or mixtures of aldehydes and ketones may also be dissolved in or mixed with an indifferent solvent or diluent, as for example dioxane, cyclohexane or ethyl alcohol, and then subjected to the condensation.

The condensation may be carried out at atmospheric or increased pressure, if desired also under reduced pressure. When using carbon dioxide, a pressure of from 10 to 150, advantageously from 20 to 50 atmospheres may be used for example. The reaction sets in spontaneously more or less rapidly depending on the nature and amount of the initial materials used and the amine salt selected, if necessary it may be initiated by heating. The reaction proceeds exothermically and may be moderated or interrupted by cooling if necessary.

The condensation products obtained are mixtures of unsaturated aldehydes or ketones and may be split up into different fractions by fractional distillation in a high vacuum. The fractions of higher boiling point often solidify to masses of crystals by cooling. The aldehydes or ketones obtained may be converted into the corresponding unsaturated alcohols for example by reduction with sodium and alcohol or aluminum isopropylate. By catalytic reduction with or without the use of pressure, the corresponding saturated aldehydes, ketones or alcohols can be obtained. The catalytic hydrogenation of the condensation products may be carried out after separating the said amine salts and the acids, but it may also be carried out in the presence of the amine salts and also if desired of the excess of acid. In the latter case the crude condensation product may be directly subjected to hydrogenation after the addition of a suitable catalyst, as for example finely divided nickel, cobalt or copper. The hydrogenation may also be carried out under such conditions that only a partial saturation of the double linkages present takes place, so that partially unsaturated aldehydes, ketones or alcohols are obtained. The products obtained according to this invention, when they still contain carbonyl groups, may be again subjected to the same condensation.

The aldehydes, ketones and alcohols obtained are very valuable intermediate products. The alcohols obtained may in turn be used for the preparation of esters of inorganic or organic acids. All these products have many possibilities of employment; in particular they may be used as assistants for the textile industries or for the preparation of the same, for example by sulphonating them.

The following examples will further illustrate how the said invention may be carried out in practice, but the invention is not restricted to these examples. The parts are by weight.

*Example 1*

A mixture of 1 part of piperidine and 10 parts of glacial acetic acid is added while cooling and stirring to 100 parts of crotonaldehyde which have been distilled while excluding oxygen. The mixture is then heated on a boiling waterbath. There thus occurs a reaction which at first is violent but which subsides after a few minutes. After about 15 minutes the whole is cooled, the viscous dark red reaction mass thus solidifies in part to waxy scales. Under a pressure of from about 15 to 18 millimeters (mercury gauge), the unconverted crotonaldehyde (about half of the amount used) and the water formed and a little glacial acetic acid are rapidly distilled off while heating gently until an internal temperature of about 50° C. is reached, whereupon the reaction product is fractionally distilled in a high vacuum. The fractions thus obtained are again fractionated in high vacuum. There are thus obtained about 10 parts of a colorless mobile oil (boiling point from 60° to 70° C. under a pressure of 10 millimeters) and from about 10 to 15 parts of a yellow oil having a greenish fluorescence (boiling point from 95° to 105° C. under a pressure of 0.5 millimeter) which rapidly solidifies to crystals; there are also obtained 4 parts of a thick orange-yellow oil smelling of pine-needles (boiling point from 130° to 140° C. under a pressure of 0.5 millimeter). The products have all the properties of unsaturated aldehydes. They may be reduced to the corresponding unsaturated alcohols by the use of aluminium isopropylate or to the corresponding saturated aldehydes or alcohols by catalytic hydrogenation.

*Example 2*

2.1 kilograms of chemically pure crotonaldehyde are charged into an autoclave of 5 liters capacity; while excluding oxygen there is added a solution of 100 grams of decahydroquinoline in 250 grams of ethyl alcohol and carbon dioxide is introduced into the mixture under a pressure of 20 atmospheres. The contents of the autoclave thus become heated. The temperature is kept at 80° C. for 8 hours and the whole is then cooled to ordinary temperature and 100 grams of a nickel catalyst are added. Hydrogen is then introduced into the autoclave under a pressure of 150 atmospheres, care being taken by cooling that the temperature does not exceed 60° C. during the course of 2 hours. A mixture of saturated aldehydes is thus obtained.

The temperature during the hydrogenation may also be raised to about 130° C. and the hydrogenation thus carried to completion. As soon as hydrogen is no longer absorbed, the whole is allowed to cool, the water is separated off and the reaction product is filtered free from catalyst. The filtrate is distilled in vacuo; the water and ethanol still present and also small amounts of butanol pass over first and there are then obtained 1.7 kilograms of an alcohol mixture boiling above 100° C. under a pressure of 60 millimeters, the mean molecular weight of which amounts to from about 300 to 350.

*Example 3*

2.5 kilograms of commercial crude aldol, consisting of 20 per cent of water, 40 per cent of acetaldehyde and 40 per cent of acetaldol, are charged into an autoclave while excluding oxygen. 85 grams of piperidine are added and carbon dioxide is then introduced into the mixture under a pressure of 25 atmospheres. The reaction mixture becomes heated and is kept at 80° C. for 8 hours. The whole is then cooled to ordinary temperature, about 100 grams of a nickel catalyst are added and hydrogen is pressed in under a pressure of 150 atmospheres. When the hydrogenation is completed, the reaction product is worked up as described in Example 2. 1.3 kilograms of a mixture of alcohols boiling at above 100° C. under a pressure of 60 millimeters is obtained the mean molecular weight of which is 300.

What we claim is:

1. Oxygen-containing condensation products obtainable by condensing in the liquid state an aliphatic aldehyde selected from the class consisting of acetaldehyde and its low molecular self-condensation and aldolization products by means of salts of organic amines in the presence of an excess of a weak acid.

2. Aliphatic oxygen-containing condensation products obtainable by condensing in the liquid state acetaldehyde by means of salts of organic amines in the presence of an excess of a weak acid.

3. A process for the production of oxygen-containing condensation products which comprises condensing in the liquid state an aliphatic aldehyde selected from the class consisting of acetaldehyde and its low molecular self-condensation and aldolization products by means of salts of organic amines in the presence of an excess of a weak acid.

4. A process for the production of oxygen-containing condensation products which comprises condensing in the liquid state acetaldehyde by means of salts of organic amines in the presence of an excess of a weak acid.

5. A process for the production of oxygen-containing condensation products which comprises condensing in the liquid state acetaldol by means of salts of organic amines in the presence of an excess of a weak acid.

6. A process for the production of oxygen-containing condensation products which comprises condensing in the liquid state crotonaldehyde by means of salts of organic amines in the presence of an excess of a weak acid.

7. A process for the production of oxygen-containing condensation products which comprises condensing in the liquid state an aliphatic aldehyde selected from the class consisting of acetaldehyde and its low molecular self-condensation and aldolization products in admixture with ketones by means of salts of organic amines in the presence of an excess of a weak acid.

8. A process for the production of oxygen-containing condensation products which comprises condensing in the liquid state an aliphatic aldehyde selected from the class consisting of acetaldehyde and its low molecular self-condensation and aldolization products in the presence of an aliphatic alcohol by means of salts of organic amines in the presence of an excess of a weak acid.

FRANZ GOTTWALT FISCHER.
ALOIS WAIBEL.
HERMANN ZORN.